United States Patent
Jordil (10) Patent No.: US 9,689,652 B2
(45) Date of Patent: Jun. 27, 2017

(54) HANDHELD MEASURING INSTRUMENT

(71) Applicant: HEXAGON TECHNOLOGY CENTER GMBH, Heerbrugg (CH)

(72) Inventor: Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 201 days.

(21) Appl. No.: 14/419,896

(22) PCT Filed: Aug. 5, 2013

(86) PCT No.: PCT/EP2013/066404
§ 371 (c)(1),
(2) Date: Feb. 5, 2015

(87) PCT Pub. No.: WO2014/023697
PCT Pub. Date: Feb. 13, 2014

(65) Prior Publication Data
US 2015/0219431 A1    Aug. 6, 2015

(30) Foreign Application Priority Data
Aug. 8, 2012   (EP) ..................................... 12179625

(51) Int. Cl.
*G01B 7/02*   (2006.01)
*G01B 3/18*   (2006.01)
(Continued)

(52) U.S. Cl.
CPC ............... *G01B 3/18* (2013.01); *G01B 3/002* (2013.01); *G01B 3/205* (2013.01); *G01B 21/047* (2013.01); *G01B 2210/58* (2013.01)

(58) Field of Classification Search
CPC ....... G01B 3/18; G01B 3/205; G01B 2210/58
(Continued)

(56) References Cited

U.S. PATENT DOCUMENTS 4,845,646 A * 7/1989 Marquis ................. G01B 3/205
33/504
4,930,096 A * 5/1990 Shimizu ................. G01B 3/205
33/784

(Continued)

FOREIGN PATENT DOCUMENTS

| CN | 1450336 A | 10/2003 |
| CN | 101713626 A | 5/2010 |
| WO | 01/65202 A1 | 9/2001 |

OTHER PUBLICATIONS

European Search Report dated Nov. 16, 2012 as received in Application No. 12 17 9625.
(Continued)

*Primary Examiner* — G. Bradley Bennett
(74) *Attorney, Agent, or Firm* — Maschoff Brennan (57) ABSTRACT

The invention relates to a handheld measurement instrument and a configurator forming a measurement kit. The measuring instrument and the configurator are provided each with an interface, enabling communication between the measuring instrument and the configurator. The handheld measurement instrument further comprises a measuring unit for measuring distances or angles of an object by contacting physically distinct points of said object; and a circuit unit applying a function of a functionality on electronic signals/electronic measurement results delivered from the measuring unit in order to deliver the measuring results in a desired form to the user by output means. The form the results should be presented can be selected by the user using input means of the measuring instrument. The circuit unit is configurable by the user using the configurator in order to determine, with which functionality the circuit unit and the input means, respectively should be equipped.

21 Claims, 4 Drawing Sheets

(51) Int. Cl.
 *G01B 21/04* (2006.01)
 *G01B 3/20* (2006.01)
 *G01B 3/00* (2006.01)

(58) Field of Classification Search
 USPC .......................................... 33/783, 784, 819
 See application file for complete search history.

(56) References Cited

U.S. PATENT DOCUMENTS

| | | | |
|---|---|---|---|
| 6,813,845 B2 | 11/2004 | Jordil et al. | |
| 7,765,712 B2* | 8/2010 | Stockman | G01B 3/205 33/700 |
| 9,316,474 B2* | 4/2016 | Stockman | G01B 5/02 |
| 2002/0088135 A1 | 7/2002 | Arlinsky | |
| 2002/0123859 A1 | 9/2002 | Mewissen et al. | |
| 2003/0047009 A1 | 3/2003 | Webb | |
| 2003/0217478 A1* | 11/2003 | Matsumiya | B82Y 30/00 33/784 |
| 2006/0010706 A1 | 1/2006 | Williams et al. | |
| 2006/0106568 A1* | 5/2006 | Feldman | G01B 3/205 702/158 |
| 2008/0177503 A1 | 7/2008 | Stockman | |
| 2012/0203504 A1* | 8/2012 | Jordil | G01B 3/205 702/162 |
| 2013/0091720 A1* | 4/2013 | Hayashida | G01B 3/18 33/819 |
| 2014/0104419 A1* | 4/2014 | Metzler | G01C 15/002 348/140 |
| 2015/0059196 A1* | 3/2015 | Asano | G01B 3/18 33/831 |
| 2016/0061574 A1* | 3/2016 | Saito | G01B 3/205 33/811 |
| 2016/0123712 A1* | 5/2016 | Cook | G06F 3/14 33/819 |
| 2016/0265893 A1* | 9/2016 | Emtman | G01B 3/205 |

OTHER PUBLICATIONS

"Capacitance Sensors for Human Interfaces to Electronic Equipment" in "Ask the Application Engineer-35", Analog Dialogue 40-10, Oct. 2006 by Susan Pratt.

* cited by examiner

Fig. 6

HANDHELD MEASURING INSTRUMENT

FIELD OF THE INVENTION

The present invention relates to handheld measuring instruments like calipers, micrometer screws, and similar instruments having a measuring unit for measuring distances or angles of an object by contacting distinct points of said object.

BACKGROUND

Figure 4A:
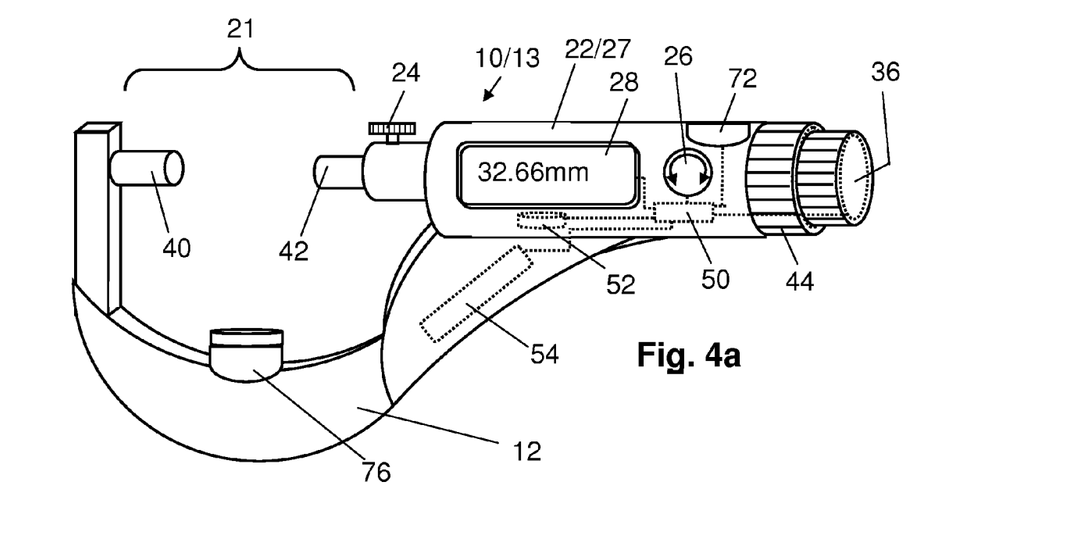
FIG. 4a a further embodiment of a handheld measuring instrument

Usually the measuring unit of those measuring instruments comprise a movable part and a fixed part, wherein the movable part can be moved by the operator for contacting physically a distinct point of the object to be gauged. The fixed part is either brought into contact with another distinct point of the object before the movable part is brought into contact or the fixed part is hold in a position relative to the object to be gauged, which position is stabilized as soon as the movable part is in contact with the object (e.g. inside micrometer screws, like presented in FIG. 4).

Nowadays those handheld measurement instruments are mostly digital instruments provided with various functionalities, e.g. unit, resolution, data collection, data collection and statistic analysis, go/no-go tolerances and further more. Usually the functionality and the required function of the selected functionality can be selected by input buttons; e.g. one button is for selecting the functionality "unit" another one is for selecting the functionality "resolution", a third one for "collecting data", a fourth one for go/no-go tolerances. Further functionalities may be accessible by pushing not one button, but synchronously two buttons. To select the various functions included in a functionality the operator has, e.g. to push the according button repeatedly for jumping from one function to the next, or the operator has to push the same or another button for differing long times in order to select one of the functions under the according functionality. Other combinations of pressing one or more buttons are well known and also usable. Functions and functionalities commonly provided with those handheld measuring instruments are: SI-unit/imperial unit under the functionality "unit"; resolution degree, e.g. 0.1 mm, 0.05 mm, 0.001 mm, 0.005 mm or 0.01 in, 0.001 in, 0.0001 in, respectively under the functionality "resolution"; the number of data, which should be collected, under the functionality "collecting data"; various methods to analyse collected data, e.g. various types to calculate an average under the functionality "analysing data"; yes/no and value of a threshold under the functionality "go/no-go tolerance"; the single function of self-calibration under the functionality "start calibration"; and further functionalities dealing with the way the data are presented or measured and collected.

US 2008/0177503 A1 discloses a caliper comprising an electronic package with several buttons, which serve as input means that are used to control various operations of the caliper, such as turning the caliper on and off, selecting display configurations, resetting of a measurement and as well selecting the setting of information presentation such as first and/or second format, etc. The electronic package may further comprise a display controller with a memory and a circuit unit. The circuit unit controls presentation of information on a display by performing operations which may be, as well as the circuit unit itself, implemented as a computer programme product, that may be embodied in an information carrier like a CD-ROM or stored in form of software in the memory of the display controller. For performing the operations, the circuit unit uses preset presentation settings that control the display and format of measurement information, e.g. measurement units, decimal or fractional representation, etc. These presentation settings may be gathered from inputs, configuration switches or from settings stored in a memory, e.g. the memory of the display controller. Thus, the presentation settings, which e.g. determine the format of a measurement to be a decimal value, are preoperationally configured and read as a first step of the operations.

US 2003/0047009 A1 discloses a complex caliper comprising a force arm, a force gauge and a processor such that the force applied to the force arm can be detected and displayed. A variety of input means like control buttons allow a user to control the caliper. For example one control button allows the caliper to be turned on or off. Other control buttons are utilized to alter the mode of operation or display presentation respectively. Those operations and display presentation can be the format of a measurement result, alerts in dependence of a measurement such as an applied force, temporary disablement of functions, execution of algorithms for evaluation or alteration of measurement results, histories of measurement results, etc. Thus, the electronic circuit unit is controlled in its functionalities by using the input means. In a specific embodiment, the caliper may comprise an interface for communication with a computer for exchange of measurement data, to program various components and/or to provide a power supply or a display.

US 2002/01235859 A1 discloses a caliper with a digital display and a plurality of buttons for controlling various functions, as on/of, scale factor, conversion, re-zero and the like. The caliper is connectable to a computer or palm pilot by hardwire connection, radio frequency or infrared transmitter for data collection or other, not further specified purposes.

A disadvantage of all the above described calipers is that a variety of input buttons is needed to allow the user a selection of or between preset operations and/or functionalities and/or functions of a distinct functionality. This requires a corresponding number of breakthroughs in the housing of the caliper, which breakthroughs open the housing and the electronic equipment within the housing for humidity and dust.

As it can be seen, the increasing amount of functionalities requires an increasing number of buttons and by that usually an increasing number of breakthroughs in the casing of such a handheld measuring instrument. But using the measurement instrument in a rough and dirty environment like a construction side, a workshop or a plant, as it is usually done, each breakthrough means danger for the electronic equipment within the casing and for the precision of the measurement.

SUMMARY

Some embodiments of the presented invention provide such a handheld measuring instrument capable to carry out functions included in a functionality and being unsusceptible to mud, liquids and dirt.

This is achieved by a handheld measuring instrument comprising a measuring unit for measuring distances or angles of an object by physically contacting distinct points of said object, said measuring unit is configured for delivering an according electronic measurement signal to a connected circuit unit. Said circuit unit is configured to transform the measurement signal into a measurement result and for delivering the measurement result to a user by output means, wherein the circuit unit is configured for applying at least one function of a functionality stored in internal storage means of the measuring instrument to the measurement result in order to present the measurement result in a desired form. Using Input means of the handheld measuring instrument enables the user to select a distinct functionality and/or a distinct function of a functionality in order to receive the measurement results in the desired form; e.g. in "mm" or in "inch". The measuring instrument is further provided with an interface enabling communication between an external configurator and the circuit unit of the handheld measuring instrument. Using the communication by means of this interface, the circuit unit is configurable by the user in order to determine, with which functionality the circuit unit and the input means, respectively should be equipped. By this measure it is possible to reduce the number of buttons included in the input means, as only the actually required functionality or functionalities are equipped to the circuit unit and the input means of the measuring instrument. Thus, the needed functionality or functionalities can be selected by the user individually case by case adapted to the current measurement using the configurator. No buttons have to be reserved for functionalities currently not required.

Hence, according to the present invention the handheld measuring instrument is configured, e.g. for a specific measurement task, not by using input means like buttons of the handheld measuring instrument itself, but by an (external) configurator, which communicates with the caliper through an interface. For example, a user utilizes the configurator to determine a functionality which is to be applied by the circuit unit of the caliper by setting a presentation setting which controls the format of measurement data, e.g. decimal or fractional representation. Having finished this configuration, the communication between the configurator and the caliper is terminated. Said circuit unit then transforms a measurement signal into a measurement result with a decimal or fractional representation according to the presentation settings. In other words, before the handheld measuring instrument is used for measuring operations or presentation settings, as an example for a functionality, which are to be operated by the circuit unit, those operations or functionalities are set by the user not using buttons of the handheld measuring instrument but using the configurator. Thus less buttons at the handheld measuring instrument are used and less breakthroughs in the housing of the handheld measuring instrument.

Further not only the circuit unit of the handheld measuring instrument is configured by using the configurator but also the input means/buttons of the handheld measuring instrument can be equipped with different functionalities.

A further advantage of such a handheld measuring instrument is that it is much simpler in use, as the number of input means/buttons and the number of currently available functionalities available for a current measurement is limited according to the current measurement task. In particular, no buttons or control contacts have to be provided for configuration of the circuit unit as configuration is done by the user with the configurator.

Thus the measuring device used here can also be considered as being a kit comprising the handheld measuring instrument, carrying out the measurement and the configurator as the control device, this because the configuration of the control unit and optionally of the input means of the handheld measuring instrument is not performed by using the input means/buttons of the handheld measuring instrument itself, but by using the configurator.

The measuring instrument is preferably a digital caliper or a digital outside micrometer screw or a digital inside micrometer screw or a digital protractor or another similar device.

As it is obvious for a person skilled in the art the handheld measuring instrument needs a power supply, preferably an internal power source in form of a battery, particularly a rechargeable battery.

In a preferred embodiment the input means of the handheld measuring instrument is—beyond the sealed on/off-button—a single button placed in a sealed way in a casing of the measuring instrument, so that liquids and dirt is prevented to enter the measuring instrument. In a further preferred embodiment the single button is also the on/off-button.

In another preferred embodiment the on/off function is implemented in the handheld measuring instrument without any buttons, but by sensing the movement of the instrument. For this purpose the handheld measuring instrument is equipped with a movement sensor, e.g. in form of a multi axis acceleration sensor. This movement sensor is electronically connected to the circuit unit, which compares the sensed movement/acceleration with a predetermined threshold. In case the sensed movement or acceleration, respectively overtraverse this threshold the handheld measuring instrument is switched on. In case the sensed movement or acceleration, respectively is below the threshold for a predetermined longer time the handheld measuring instrument will be switched off, wherein the time the sensed movement has to be below the threshold for switching off can be determined by the user.

In another preferred embodiment the input means are formed as sealed push button or tappet switch, preferably made of an elastomer and sealed, e.g. by a silicone; or as push button or tappet switch covered by a foil, the foil preferably covering a whole front of the handheld instrument where the button is located. Using this type of button gives a reliable protection against dirt and liquids.

The most preferred embodiment is provided with one or more capacitive buttons, as the use of those buttons prevents entering of dirt and liquids the best. Here as well one button is preferred over two or more buttons as it makes operating of the measuring instrument easier and reduces costs. Most preferred anyway are input means in form of a capacitive push-button, a capacitive 8-way switch, a capacitive slider, a capacitive wheel, a capacitive keypad or a capacitive touch screen. The capacitive buttons can be built e.g. as described in "Capacitance Sensors for Human Interfaces to Electronic Equipment" in "Ask The Application Engineer-35", Analog Dialogue 40-10, October 2006 by Susan Pratt.

Thus the functionality of the buttons can be described as being an either/or -button enabling the choice between two alternatives or an either/or/or/ . . . -button enabling the choice between three or more variations by pressing the button various times or for differing long times or by moving a slider mechanically or capacitively along a circle or along a linear path.

The input means and the circuit unit of the handheld measuring instrument, respectively are configurable by means of the configurator for carrying out one or more selected functionalities.

Thus, a configuration is not done by using the input means, but solely by using the configurator.

The selected functionality or functionalities are out of the group comprising at least: presentation of the measurement result in SI-units or in imperial units; adaptation of the resolution to the dimensions of the object to be gauged;

collecting measurement results/data; collecting data and analysing the collected data statistically/mathematically; setting of a go/no-go tolerance; setting of an automatic minimum and/or automatic maximum; setting of an absolute measurement or a relative measurement; defining a "zero"-reference; storing the current measurement; starting self-calibration.

In a further preferred embodiment the input means and the circuit unit, respectively are programmable with additional functionalities and/or application programs by using communication between the circuit unit and the configurator by means of the interface, wherein functionalities are software applicable on the measurement results or measurement signals in order to present them in a desired way, while programs are additional software usable independently of the measurement results/measurement data enabling additional features.

Advantageously the handheld measuring instrument is provided with a light source and the input means and the circuit unit, respectively are programmable with a "light source" program by the user using the configurator. This can particularly be useful, when measuring in dark machine locations.

Particularly the measuring instrument is provided with a sound generator and storage means to store sound files, wherein the storage means and the sound generator are electronically connected to the circuit unit. Further the circuit unit and the input means are programmable with the program "voice generator" and the sound files are loadable to the handheld measuring instrument by the user using the configurator. The sound files can e.g. be spoken instructions, what to measure, or music.

In a further preferred embodiment the measuring instrument is provided with a camera to take digital images and storage means to store the digital images. The input means and the circuit unit, respectively are programmable by the user with a "camera" program by means of the configurator. This feature can advantageously be used for taking pictures of the object, which had been gauged. Further the handheld measuring instrument being provided with an image-transfer interface for transferring the digital images to an external electronic unit, like a memory card, computer or beamer.

Of course the handheld measuring instrument can be provided with a combination of those devices like, a camera and a light source or a camera and a sound generator or a light source and a sound generator or a camera and a light source and a sound generator, wherein—beside the functionalities needed for the particular measurement—dependent on the current measurement to be carried out only the actually needed programs for the needed device(s) be programmed to the circuit unit and the input means of the handheld measuring instrument.

Further programs not related to an additional device integrated in the handheld measuring instrument can be "turn-off time" having the functions of various turn-off times, which can be selected under this program. This is especially usable in cases where the on/off function is coupled to a movement- or multi axis accelerations-sensor, respectively as described above, but can also make sense in cases of regular on/off-buttons. Another program can be e.g. a "button-operations" program enabling various options of how a button can be used, like pressing the button repeatedly or for a long time, or together with another button etc.

The configurator comprises a circuitry, configurator input means and an interface. The interface is provided to enable communication between the circuitry of the configurator and a circuit unit of a handheld measuring instrument. The circuitry is configured to configure the circuit unit and input means, respectively of the handheld measuring instrument with the desired functionalities stored in the internal storage means of the handheld measuring instrument by means of said interface. The configurator input means are provided to allow the user to transmit the necessary instructions to the configurator and its circuitry to configure the handheld measuring instrument by means of the interface in the desired way.

In a preferred embodiment the interfaces of the handheld measuring instrument and the configurator, used for the communication between the two devices, are wired ore wireless interfaces especially adapted to one another and to the configuration operation to be administrated. This allows a very fast configuration.

In another preferred embodiment the interfaces of the handheld measuring instrument and the configurator are configured as conventional wired or wireless interfaces adopted to communicate with each other like, WLAN-interfaces, USB-interfaces, Bluetooth-interfaces, infra-red interfaces, radiofrequency antennas, external buses, Ethernet-interfaces; serial ports; etc. Using those standard interfaces reduces the manufacturing costs.

In a preferred embodiment the configurator further comprises storage means for storing software, which is at least functionalities to configure a handheld measuring instrument as described above, but also can comprise programs to program such an instrument; wherein functionalities are software applicable on the measurement results or measurement signals received by the handheld measuring instrument in order to present them in a desired way, while programs are additional software usable independently of the measurement results/measurement data enabling additional features. The circuitry of such a configurator is configured for managing upload of this software to the handheld measuring instrument and to configure and optionally program the circuit unit and the input means of the handheld measuring instrument in accordance with the uploaded software.

In another advantageous embodiment the configurator comprises additionally an interface to communicate with an external storage unit, like a local computer or a server in an internal network (firm-network) or a server in an external network or with a cloud in the World Wide Web, and the circuitry is configured for managing download (and optionally upload) of suitable software for the handheld measuring instrument from (and to) said external storage unit.

The configurator is preferably constructed as a charging device usable for recharging batteries of the handheld measuring instrument. For this purpose it advantageously is designed in form of a docking station, giving the handheld measuring instrument a fixed place and a defined position when not in use and/or when configured/programmed.

In another embodiment the configurator can be a conventional laptop, a personal computer, a mobile phone, or a similar known device. In this case recharging of batteries can be achieved e.g. by means of a USB-connection or similar known devices.

Preferably the handheld measuring instrument and the configurator are delivered to the user as a measurement kit. The handheld measuring instrument usually is delivered having at least the most important functionalities stored in the internal storage means, like "resolution" and/or "unit". Further functionalities and optionally programs can either be delivered by means of the configurator and its configurator storage means or by means of the configurator communicating with an external storage means, like a server or a cloud in the World Wide Web. It is also possible to integrate in said measurement kit a computer readable storage medium comprising that software and being readable by the configurator or readable by a computer, which can either electronically be connected to the configurator as described above or serve itself as configurator. In cases where the handheld measuring instrument has an interface for memory cards it might even be possible that the computer readable storage medium with the software is configured as a memory card readable by the handheld measuring instrument.

As described above the measurement kit comprising such a handheld measuring instrument and a configurator are provided for being configurable individually by a user adapted to the individual needs of a user and/or the requirements for the current measurement to be carried out. Thus before starting the measurement a user should think about which functionalities he will have to use for the measurement he/she wants to carry out—and, in case the kit is equipped accordingly, optionally which additional features he/she wants to carry out. Afterwards the user can configure/program the handheld measuring instrument accordingly.

In order to configure/program the handheld measuring instrument the user connects the handheld measuring instrument and the configurator by means of their interfaces so, that the circuitry of the configurator and the circuit unit of the handheld measuring instrument can communicate; he/she selects the according functionality/functionalities and optionally program/programs and give the instructions for an according configuration and optionally programming by means of the configurator input means; the configurator configures and optionally programs the circuit unit and the input means of the handheld measuring instrument accordingly, so that they are equipped with the selected functionality/functionalities and optionally program/programs, by the means of control signals sent from the configurator to the circuit unit of the measuring instrument. The input means of the handheld measuring instrument now show only the functionality/functionalities and optionally program/programs selected by the user, which reduces the number of buttons needed and makes handling of the handheld measuring instrument easier.

In case the measurements to be carried out are the same for a large set of objects the handheld measuring instrument can be preconfigured, so that less professional and/or less trained persons can handle the handheld measuring instrument as well. The handheld measuring instrument can also be preconfigured in adaptation to the predilection of a particular user. That does not only concern the functionalities/features usable but also the way the input means are usable like pressing a button for a long time or repeatedly and so on.

In cases, where additional functionalities and/or programs can be downloaded from an external storage unit into the storage means of the configurator, the handheld measuring instrument is not limited in its functionality/features any more. New developments can be considered by providing according new functionalities/programs to the user on external storage units, like a server in an external network reachable by means of the internet or like a cloud in the World Wide Web. For this purpose the configurator can have a particular communication interface or the interface used for the communication with the handheld measuring instrument can be configured in a way that it can be used for this kind of communication as well.

BRIEF DESCRIPTION OF THE DRAWINGS

The invention will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. The drawings show schematically.

DETAILED DESCRIPTION

Figure 1:
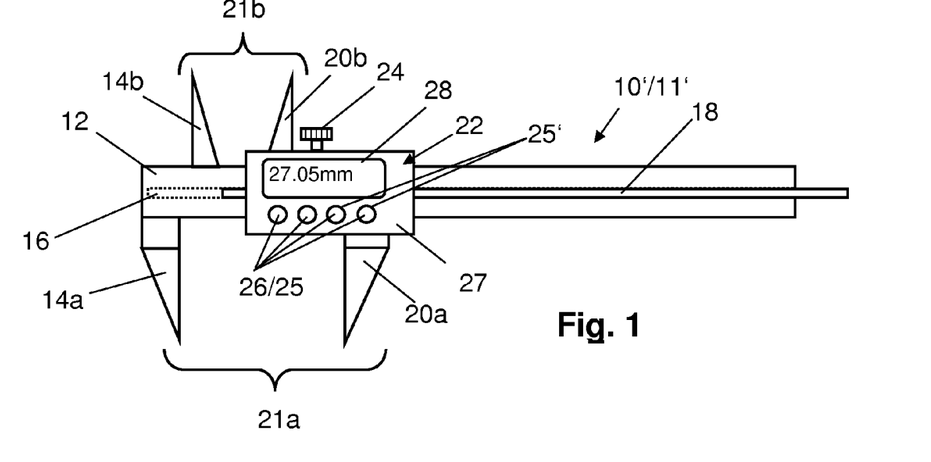
FIG. 1 a state of the art handheld measuring instrument, particular a state of the art digital caliper.

FIG. 1 shows a handheld measuring instrument 10' in form of a digital caliper 11' as it is known as state of the art. The caliper has an elongated body 12 having at one end a fixed jaw 14a for outside measurements and a fixed jaw 14b for inside measurements. The body comprises an elongated groove 16 to guide a bar 18, which bar 18 is fixed to a sliding body 22 configured to slide alongside the elongated body 12 of the caliper 10'/11'. The bar 18 and the groove 16 are configured in a way, that the bar 18 can be used in order to measure the depth of a hole, like a borehole or a recess. Fixed to the sliding body 22 is a movable outside jaw 20a configured for working together with the fixed outside jaw 14a as a measuring unit 21a for measuring distances between distinct outside positions of an object. Also fixed to the sliding body 22 is a movable jaw 20b configured for working together with the fixed inside jaw 14b as a measuring unit 21b for measuring distances between opposite positions inside a hole or recess of an object. Jaws 20a, 20b are fixed to the sliding body 22 and movable with the sliding body 22 relative to the fixed jaws 14a, 14b. In order to allow fixation of the movable jaws 20a, 20b and or the bar 18 at a distinct position, a locking screw 24 is provided. The sliding body 22 comprises a sliding linear encoder (not shown), a circuit unit (not shown), a battery (not shown), output means 28 and input means 26. The encoder is configured to send electrical measurement signals to the circuit unit and the circuit unit is configured for transforming the measurement signals in presentable measurement results and for sending said measurement results to the output means 28. In this embodiment the output means 28 is a display presenting the measurement results in a digital scale and the input means are four buttons 25 for allowing the user to select a desired function of a required functionality, e.g. the SI-unit "mm" or the imperial unit "inch" under functionality "unit"; select between "0.1 mm", "0.05 mm", "0.001 mm", "0.005 mm" or "0.01 in", "0.001 in", "0.0001 in", respectively under functionality "resolution"; collecting a desired number of data under functionality" collect data and further more. The four buttons 25 are accommodated in four breakthroughs 25' of the casing 27 and built four points of weakness with respect to risks based on dirt, mud and liquids in a dirty environment.

As there are so many functions and functionalities today, each button has up to 3 operation modes (short-, medium- and long-click) and additional functions/functionalities are available pressing 2 buttons at the same time. Thus, the handheld measuring instrument 10 looking so simple actually is not simple anymore and users have to be educated accordingly to use the instruments correctly. Some users might even be overstrained.

In contrary the handheld measuring instrument 10 according to the invention has quite simple input means preventing a high number of breakthroughs in the casing, but nevertheless has a high variety of functionalities and is still simple in use.

Figure 2:
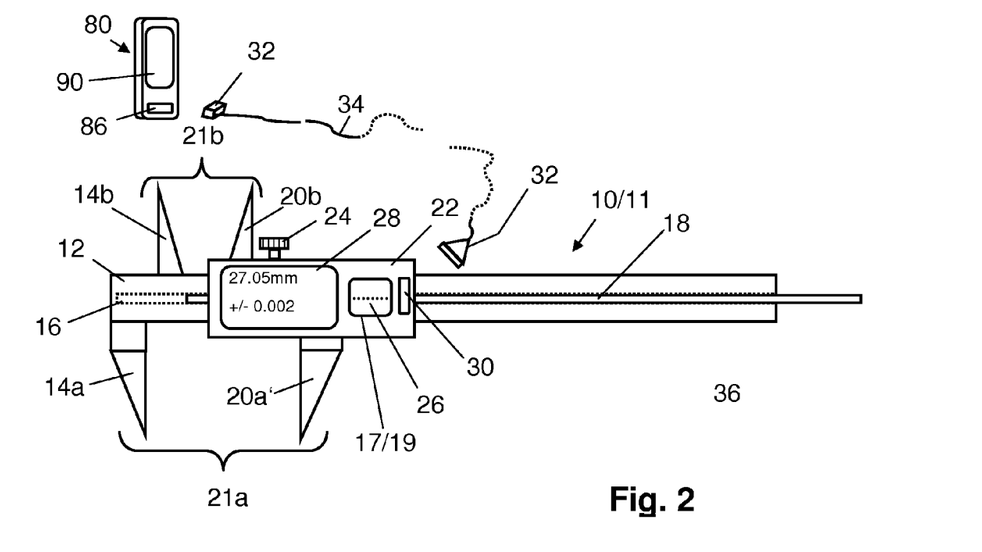
FIG. 2 a first embodiment of a handheld measuring instrument according to the invention and a first embodiment of a configurator together forming a measurement kit.

FIG. 2 shows a first embodiment of such a handheld measuring instrument 10 in form of a caliper 11, quite similar to the caliper 11' presented in FIG. 1. However instead of four buttons as input means, the shown example of a handheld measuring instrument 10 has only one single tappet switch as an input means 26. The handheld measuring instrument 10 has further an interface 30 enabling communication with a configurator 80, having an according interface 86. In this embodiment communication is realized as a wired communication. A cable 34 with male interface 32 adapted to the female interfaces 86, 30 of configurator 80 and instrument 10, respectively is used for installing the wired communication. The configurator in this embodiment has a touch screen 90 as input and output means. Using the configurator 80 enables the user to configure the input means 26 of the handheld measuring instrument 10 with the functionalities, the user actually needs. This restriction allows the use of only a single tapped switch as input means 26, which is placed in a breakthrough 17 of the casing and sealed with silicone 19. Thus, the restriction to a few functionalities, which are actually used for the current measurement, can prevent a high number of breakthroughs in the casing 27 and reduce the risk of dirt and liquid penetration and additionally makes the handling of the instrument 10 easier. Selection of the needed functionalities is made by means of the touch screen 90 of the configurator 80, when handheld measuring instrument 10 and configurator 80 are connected. Thus, configurator 80 and handheld measuring instrument 10 build a measurement kit. The functionalities are stored in storage means of the handheld measuring instrument 10. Additional functionalities not used so often may also be stored in internal storage means of the configurator 80. Updates and new functionalities might even be downloadable from an external storage means (not shown) to the internal storage means of the configurator 80 and by that be applicable for the handheld measuring instrument 10. Downloading of the new functionality may be achieved by using the interface 86 and the cable 34. Further, the cable 34 connecting the configurator and the handheld measuring instrument 10 can be used for recharging the batteries of the handheld measuring instrument 10.

Functions of required functionalities can be, e.g. the SI-unit "mm" or the imperial unit "inch" under functionality "unit"; select between "0.1 mm", "0.05 mm", "0.001 mm", "0.005 mm" or "0.01 in", "0.001 in", "0.0001 in", respectively under functionality "resolution"; collecting a desired number of data under functionality" collect data and further more; select between various methods to analyse the collected data under functionality "analysing data"; select yes/no and value of a threshold under the functionalities "automatic minimum", "automatic maximum", "go/no-go tolerance", "store minimum", "store maximum", "set reference"; just give the instruction to carry out the one function under functionalities "store current data" and "start calibration", and further more functionalities.

Figure 3:
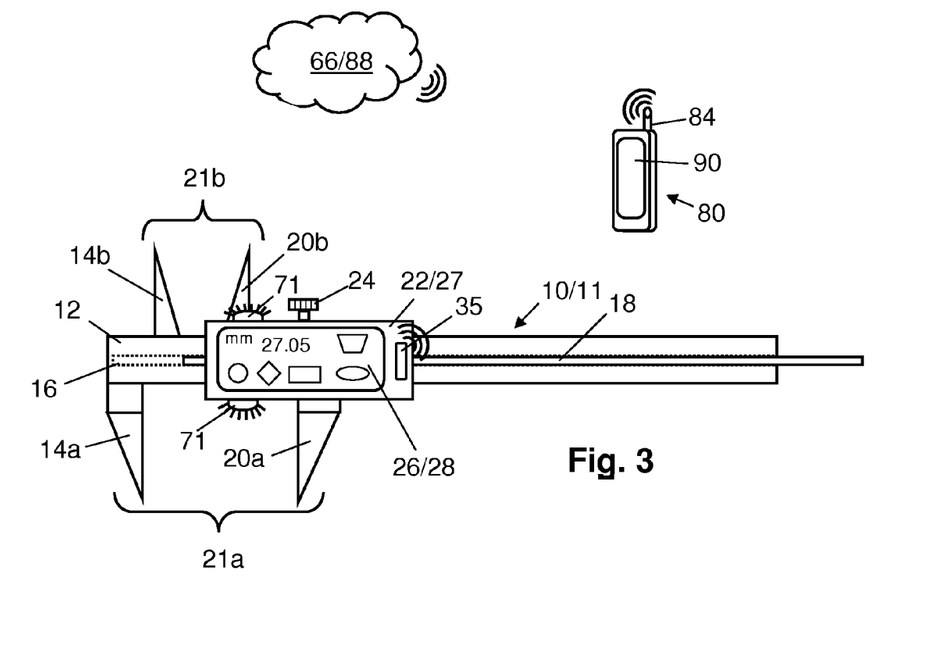
FIG. 3 a second embodiment of a handheld measuring instrument according to the invention and a second embodiment of a configurator together forming a measurement kit.

Another embodiment of a caliper 11 as handheld measuring instrument 10 is presented in FIG. 3 building a measurement kit with a further embodiment of a configurator 80. In this embodiment the input means 26 of the handheld measuring instrument 10 are at the same time the output means 28 and are formed as a touch screen. The handheld measuring instrument has further light sources 71 enabling an illumination of the object to be gauged. For this additional device, light source 71, a program is stored either in the storage means of the caliper 10 in case the feature of illumination is used very often, otherwise the program can be stored in the internal storage means of the configurator 80 and loaded only when needed. The configurator 80 is the same as the one in FIG. 2, but the interface for communication with the handheld measuring instrument 10 is a wireless interface 84. Accordingly the interface of the handheld measuring instrument 10 is a wireless interface 35 too. The wireless interface 84, 35 can be a Bluetooth® interface or an infrared interface or, as in this case, a WLAN antenna able to communicate with a cloud 88 of the World Wide Web. The cloud 88 serves as external storage means 66 and updates as well as new functionalities and additional programs for activating further features, beside illumination, can be downloaded from there.

In FIG. 4a an outside micrometer screw 13 as a handheld measuring instrument 10 is shown. As known from state of the art digital outside micrometers, the micrometer screw 13 has a measuring unit 21 comprising a fixed bolt 40 and a movable bolt 42 adjustable by an adjusting screw 44 and fixable by a locking screw 24. The movement of the movable bolt 42 is transformed in an electrical signal and transmitted to a circuit unit 50. The circuit unit 50 transforms the measurement signal in a measurement result and transmit the result to output means 28 in order to present it in a desired way to the user, by applying a selected function of a chosen functionality on the measurement signal.

Figure 4B:
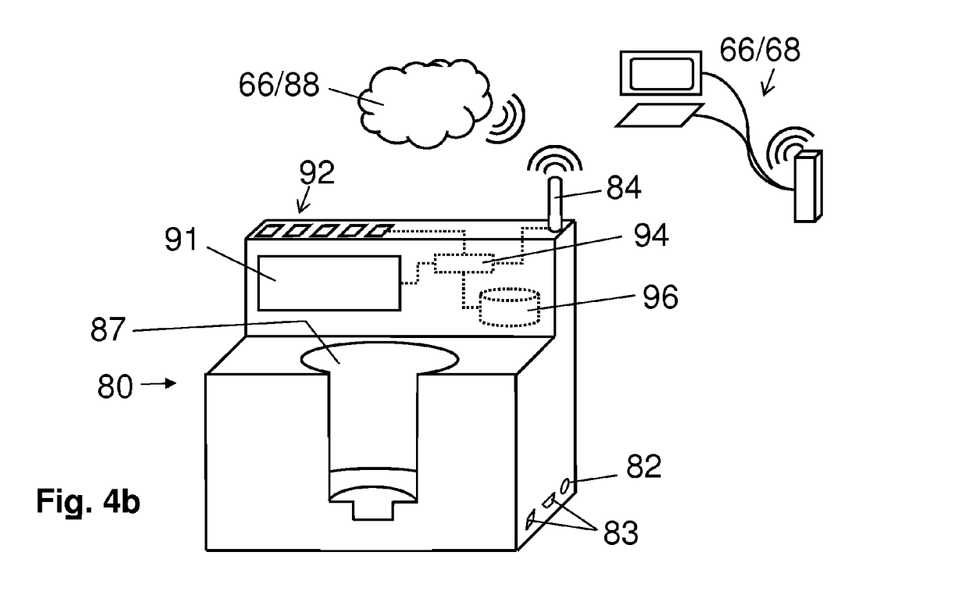
FIG. 4b a further embodiment of a configurator forming a measurement kit together with the handheld measuring instruments of FIGS. 4a and 4b.

In this example input means 26 for selecting a particular function of a particular functionality and for selecting the functionality are built by a capacitive 8-way switch. The capacitive 8-way switch is configurable by the user with, e.g. eight different functionalities using, e.g. a configurator 80 like it is shown in FIG. 4b. This configurator 80 is constructed as a holder the handheld measuring instrument 10 can be put it. The functionalities which can be selected by the user are stored with further functionalities in storage means 52 of the handheld measuring instrument 10.

Further the handheld measuring instrument 10 is provided with a sound generator 72 that is connected with the circuit unit 50. An according "voice program" enabling the circuit unit 50 to work as a voice generator and to control the sound generator 72 is stored in the storage means 52. Thus the sound generator 72 can be used for giving acoustic warning signals in connection e.g. with the function "no-go tolerance" of the functionality "go/no-go tolerance" or it can be used for voice instructions to the user or for playing music. Further "voice programs" can be stored in internal storage means of the configurator 80 and uploaded from there if needed. An interface for connecting ear-phones can be provided (not shown) with the handheld measuring instrument 10 also.

As a further additional device a digital camera 76 is provided connected to the storage means 52 for storing the digital images. The camera 76 enables to take picture of the object to be gauged even during gauging. The handheld measuring instrument can be provided with a particular interface (not shown) to transmit the digital images from the handheld measuring instrument 10 to an external electronic unit, like a beamer or computer. Said interface could also be formed as a slot for an according memory card.

For providing power to the configurator the configurator is provided with a power supply interface 82. The configurator serves further for recharging batteries 54 of the handheld measuring instrument 10, when the instrument 10 is putted in the configurator female interface 87. In order to be able to communicate with various external electronic units the configurator shows wired interfaces 83 as well as a wireless interfaces 84. External storage means 66 can be clouds 88 of the World Wide Web, a server 68 of a net-work or a local computer 70.

Figure 6:
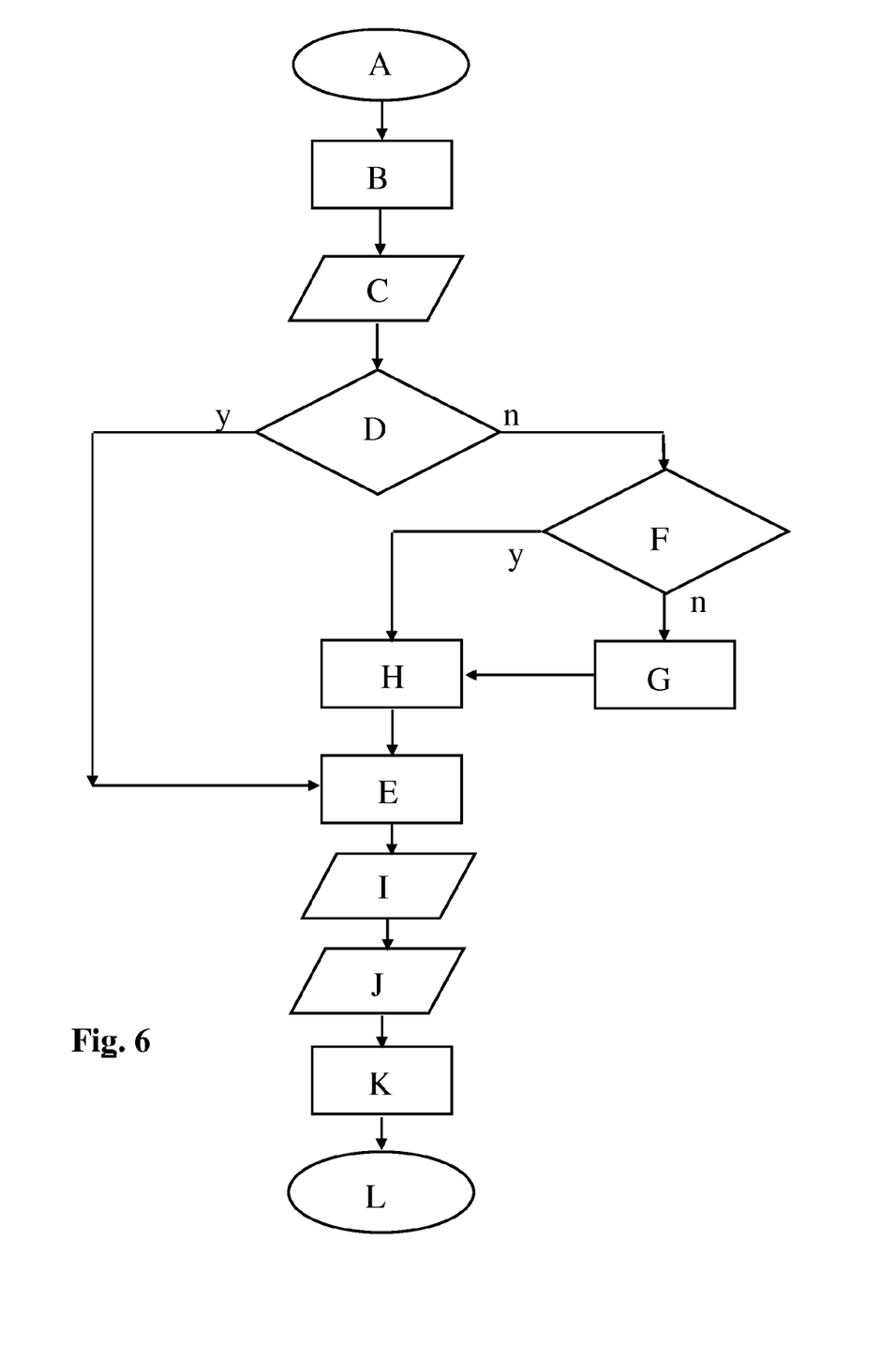
FIG. 6 a scheme of the method, how to use a kit of handheld measuring instrument and configurator

The process/method how to configure and to use such a kit of a handheld measuring instrument 10 and a configurator 80 is also schematically shown in general in FIG. 6; but should now be described by means of the general presentation of FIG. 6 and by means of FIGS. 4a and 4b: The method starts at A when the user decided which functionalities/programs he/she wants to use. The 8-way switch 26 can than be configured accordingly by connecting (step B) the handheld measuring instrument 10 to the configurator 80. In the particular case of micrometer screw 13 and configurator 80 of FIGS. 4a, 4b the user puts the handheld measuring instrument 10/13 with its male interface 36 in the provided female interface 87 of the configurator 80. By using the input means 92 of the configurator 80 the user can select (step C) functionalities/programs he/she wants to use and the configurator 80 communicates accordingly with the circuit unit 50 of the handheld measuring instrument 10/13. Optionally the selected functionality/program is shown at a display 91 of the configurator 80 enabling the user to verify its input. In case the wanted functionality/program is stored in the storage means 52 of the handheld measuring instrument 10, the circuit unit 50 and the 8-way switch 26 of the handheld measuring instrument 10/13 are equipped by the according functionalities/programs by according instruction signals sent from a circuitry 94 of the configurator 80 via the interfaces 87, 36 to the circuit unit 50 of the handheld measuring instrument 10 (step E). In case the wanted functionality/program is not stored in the storage means 52 of the handheld measuring instrument 10, circuitry 94 of the configurator verifies whether the wanted functionality/program is stored in the internal storage means 96 of the configurator (step F). In case the functionality/program is stored in the internal storage means the functionality/program is uploaded to the storage means 52 of the handheld measuring instrument 10 (step H) and than the input means 26 and the circuit unit of the handheld measuring instrument 10 are equipped accordingly (step E). In case the wanted functionality/program is not stored in the internal storage means 96 of the configurator it possibly can be downloaded from an external storage means 66, like in this case from a cloud 88 of the World Wide Web, and stored in the internal storage means 96. From there it is uploaded to the storage means 52 of the handheld measuring instrument 10 (step H) and the circuit unit 50 and the input means 26 are configured or programmed accordingly (step E). When the handheld measuring instrument 10 than is used, the wanted functionality/programs can be selected (step I) from those functionalities/programs which are currently equipped to the handheld measuring instrument 10. The measuring can be carried out with the selected functionalities/programs (step J). The result is presented in the desired way (step K) and the process of measuring with the measurement kit according to the invention is finished (L).

Thus the method/process can be described shortly as follows

B) connecting the handheld measuring instrument and the configurator by means of their interfaces C) selecting one or more functionalities and/or programs and instructing the configurator to configure or program the handheld measuring instrument accordingly with the selected functionality/functionalities and/or program/programs;

D) to E) waiting until the configurator has accomplished the configuration and/or programming of the circuit unit and the input means of the handheld measuring instrument, so that they are equipped with the selected functionality/functionalities and/or program/programs I) selecting the currently wanted functions of currently wanted functionalities/programs by using the accordingly configured/programmed input means of the handheld measuring instrument J) carrying out the measurement and K) achieving the presented measurement result in the desired form.

Figure 5:
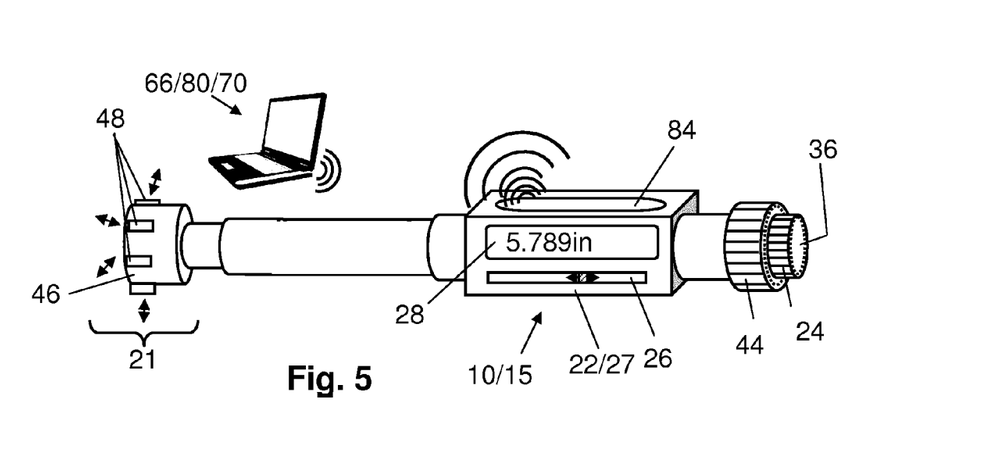
FIG. 5 a further embodiment of a handheld measuring instrument.

A further example of a handheld measuring instrument 10 according to the invention is sown in FIG. 5 in form of an inside micrometer screw 15. The handheld measuring instrument is in principle the same as the one shown in the figures before, but instead of hawing jaws or bolts the inside micrometer 15 has a fixed cylinder 46 with stamps 48 movable radially outwardly from the cylinder. The movement of the stamps again can be adjusted by an adjusting screw 44 and fixed by a locking screw 24. The input means in this case is a capacitive slider 26. Measuring results are presented on a display 28 used as output means. In this example the configurator 80 can be a computer 70 communicating with the handheld measuring instrument 10/15 wireless by the wireless interface 84.

A person skilled in the art can easily recognize which elements given in the embodiments and the description above can be combined in a way that makes sense. However, it is not possible to show and describe all possible combinations as a matter of space.

As it has been shown above the new concept of handheld measuring instruments having configurable input means provided in a kit with an according configurator provides multi-functionality of the handheld measuring instrument by a high robustness and simplicity of use.

What is claimed is:

1. A handheld measurement instrument comprising:
a measuring unit for measuring distances or angles of an object by contacting physically distinct points of said object, said measuring unit is configured for delivering an according electronic measurement signal to a connected circuit unit;
the circuit unit being configured to transform the measurement signal into a measurement result and for delivering the measurement result to a user by output means, wherein the circuit unit being configured for applying at least one function of a functionality stored in storage means of the measuring instrument to the measurement result in order to present the measurement result in a desired form; and
input means enabling the user to select a distinct functionality and/or a distinct function of a functionality; wherein:

the measuring instrument is provided with an interface enabling communication between the circuit unit of the measurement instrument and an external configurator; and the circuit unit is configurable by the user using the external configurator in order to determine, with which functionality the circuit unit and the input means, respectively should be equipped, such that only the actually required functionality or functionalities are equipped to the circuit unit and the input means, respectively, adapted to the current measurement and/or the predilection of a particular user.

2. The measuring instrument according to claim 1, wherein:

the input means is a single button placed in a sealed way in a casing of the measuring instrument, so that liquids and dirt is prevented to enter the measuring instrument.

3. The measuring instrument according to claim 1, wherein:

the input means comprises at least one of the group consisting of: push button or tappet switch, a capacitive button, a capacitive push-button, a capacitive 8-way switch, a capacitive slider, a capacitive wheel, a capacitive keypad, and a capacitive touch screen.

4. The measuring instrument according to claim 3, wherein the push button or tappet switch is made of an elastomer.

5. The measuring instrument according to claim 3, wherein the push button or tappet switch is covered by a foil.

6. The measuring instrument according to claim 3, wherein foil covers a whole front of the handheld instrument where the button is located.

7. The measuring instrument according to claim 1, wherein:

the input means and the circuit unit, respectively are configurable and/or programmable with additional functionalities and/or programs by using communication between the circuit unit and the external configurator via the interface.

8. The measuring instrument according to claim 1, further comprising:

a sound generator and storage means to store sound files loadable by the user using the external configurator;

wherein the circuit unit is programmable by the user as a voice generator and a program "voice generator" is applicable to the input means both by means of the external configurator.

9. The measuring instrument according to claim 1, further comprising:

a light source, wherein the input means and the circuit unit, respectively are programmable with a "light source" program by the user using the external configurator.

10. The measuring instrument according to claim 1, further comprising:

a camera to take digital images;

a storage means to store the digital images; and an image-transfer interface for sending the digital images to an external electronic unit, wherein the input means and the circuit unit, respectively are programmable by the user with a "camera" program by means of the external configurator.

11. The measuring instrument according to claim 1, wherein the measuring instrument comprises at least one of the group comprising:

a digital caliper, an outside micrometer screw, and an inside micrometer screw.

12. The measuring instrument according to claim 1, wherein functionalities are software applicable on the measurement results or measurement signals in order to present the measurement result in a desired way, and a functionality selectable for configuration the circuit unit and input means are at least one of the group comprising: unit, resolution, collect data, analysing data, automatic minimum, automatic maximum, go/no-go tolerance, store minimum, store maximum, set reference; store current data, start calibration.

13. An external configurator, which is a physically separate element, external to the measurement instrument of claim 1, comprising:

an internal storage means for storing software comprising programs and functionalities to configure or program a handheld measuring instrument according to claim 1;

a circuitry managing download from an external storage unit;

an interface to communicate with that external storage means; and a communication interface to communicate with a circuit unit of the handheld measuring instrument in order to equip the input means and the circuit unit, respectively of said handheld measuring instrument with the according functionalities and/or programs.

14. The configurator according to claim 13, wherein the circuitry manages upload of the software to the external storage unit.

15. One or more non-transitory computer-readable media storing one or more programs and/or functionalities for a handheld measuring device according to claim 1.

16. A measurement kit comprising the handheld measuring instrument and the external configurator according to claim 11.

17. The measurement kit according to claim 16, comprising:

a computer program product storage medium.

18. A method comprising:

connecting a handheld measuring instrument and an external configurator by means of their interfaces, selecting one or more functionalities and/or programs adapted to the current measurement and/or predilection of a particular user and instructing the configurator to configure or program the handheld measuring instrument accordingly with the selected functionality/functionalities and/or program/programs;

waiting until the configurator has accomplished the configuration and/or programming of the circuit unit and the input means of the handheld measuring instrument, so that they are equipped only with the selected actually desired functionality/functionalities and/or program/programs carrying out the measurement by using the selected functionality/functionalities and/or program/programs by using the accordingly configured/programmed input means of the handheld measuring instrument achieving the measurement result in the desired form.

19. The method according to claim 18, wherein additional functionalities and/or programs are downloaded from an external storage means to internal storage means of the configurator by means of a communication interface of the configurator and then are disposable for configuring/programming the handheld measuring instrument.

20. The measuring instrument according to claim 1, wherein the measuring instrument is equipped with a movement sensor, in particular a multi axis acceleration sensor, wherein the on/off function of the handheld measuring instrument is implemented by sensing the movement of the handheld measuring instrument by the movement sensor.

21. The measuring instrument according to claim 7, wherein a program is an additional software usable independently of the measurement results/measurement signal enabling additional features, the program may be at least one of the group consisting of a light source, a voice generator, and a camera.

\* \* \* \* \*